(12) United States Patent
Han

(10) Patent No.: US 11,637,832 B2
(45) Date of Patent: Apr. 25, 2023

(54) VEHICLE, SERVER, AND METHOD FOR CONTROLLING THE SAME

(71) Applicants: Hyundai Motor Company, Seoul (KR); Kia Motors Corporation, Seoul (KR)

(72) Inventor: Jeongseok Han, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 648 days.

(21) Appl. No.: 16/701,335

(22) Filed: Dec. 3, 2019

(65) Prior Publication Data

US 2020/0322337 A1    Oct. 8, 2020

(30) Foreign Application Priority Data

Apr. 5, 2019    (KR) .................. 10-2019-0039993

(51) Int. Cl.
| | | |
|---|---|---|
| *H04L 9/40* | (2022.01) | |
| *G06Q 10/02* | (2012.01) | |
| *B60R 25/24* | (2013.01) | |
| *G05D 1/02* | (2020.01) | |
| *B60R 25/30* | (2013.01) | |

(52) U.S. Cl.
CPC .............. *H04L 63/10* (2013.01); *B60R 25/24* (2013.01); *B60R 25/30* (2013.01); *G05D 1/0285* (2013.01); *G06Q 10/02* (2013.01); *G05D 2201/0212* (2013.01)

(58) Field of Classification Search
CPC ....... H04L 63/10; H04L 63/107; H04L 67/12; H04L 67/53; B60R 25/24; B60R 25/30; B60R 25/241; B60R 2325/205; G05D 1/0285; G05D 2201/0212; G06Q 10/02; G06Q 50/30; G07F 17/0057; H04W 4/40; B60W 60/0025; B60W 60/00253; B60W 60/00256; B60W 60/00259; B60W 2040/0809; B60W 2540/043; B60W 2540/045; B60W 40/09; B60W 2540/047
USPC ............................................. 726/4; 340/5.72
See application file for complete search history.

(56) References Cited

U.S. PATENT DOCUMENTS

| | | | | |
|---|---|---|---|---|
| 8,688,532 B2 * | 4/2014 | Khunger | ............. | G06Q 10/047 |
| | | | | 705/26.1 |
| 10,214,118 B1 * | 2/2019 | Jain | ........................ | B60K 35/00 |
| 10,850,706 B2 * | 12/2020 | Hiruta | .................... | G07C 5/085 |
| 2008/0309454 A1 * | 12/2008 | Tsuji | ................... | B60R 25/2081 |
| | | | | 340/5.6 |
| 2014/0222298 A1 * | 8/2014 | Gurin | ..................... | G06Q 10/08 |
| | | | | 701/49 |

(Continued)

FOREIGN PATENT DOCUMENTS

KR    10-2016-0104144 A    9/2016

*Primary Examiner* — Nam V Nguyen
(74) *Attorney, Agent, or Firm* — Fox Rothschild LLP

(57) ABSTRACT

A server assigns a vehicle to be provided with a vehicle sharing service to a user based on the received at least one piece of schedule information and position information of a plurality of the vehicles when at least one of schedule information of the user and use information of a vehicle sharing service is received by a terminal for the user. The server operates a communication device to transmit identification information of the assigned vehicle to the terminal for the user, and operates the communication device to transmit user information to the assigned vehicle.

18 Claims, 12 Drawing Sheets

(56) References Cited

U.S. PATENT DOCUMENTS

| | | | |
|---|---|---|---|
| 2014/0309862 A1* | 10/2014 | Ricci | H04W 36/34 |
| | | | 701/36 |
| 2016/0321566 A1* | 11/2016 | Liu | G05D 1/0011 |
| 2017/0050617 A1* | 2/2017 | Penilla | G06Q 30/0643 |
| 2017/0197678 A1* | 7/2017 | Scaringe | B60K 1/00 |
| 2018/0024725 A1* | 1/2018 | Penilla | B60W 40/08 |
| | | | 701/49 |
| 2019/0109854 A1* | 4/2019 | Shimizu | H04L 63/0876 |
| 2019/0123893 A1* | 4/2019 | Endo | H04L 67/12 |

* cited by examiner

FIG. 7

| TIME ZONE | 7:00 ~ 10:00 | 10:01 ~ 12:00 | 12:01 ~ 16:00 | 16:01 ~ 22:00 |
|---|---|---|---|---|
| USER A | D(S) | S | D(S) | |
| USER B | | F | | |
| USER C | | | | D |

FIG. 8

| TIME ZONE | 7:00 ~ 10:00 | 10:01 ~ 12:00 | 12:01 ~ 16:00 | 16:01 ~ 22:00 |
|---|---|---|---|---|
| USER A | D | F | D | |
| USER B | S (TRANSPORTING) | | | |

FIG. 9

| TIME ZONE | 0:00 ~ 7:00 | 7:01 ~ 12:00 | 12:01 ~ 14:00 | 14:01 ~ 17:00 |
|---|---|---|---|---|
| USER A | S | | | |
| USER B | | D | | D |
| USER C | | | F | |

FIG. 10

| TIME ZONE | 7:00 ~ 12:00 | 12:01 ~ 17:00 | 17:01 ~ 19:00 |
|---|---|---|---|
| USER A | D(V1) | | D(V2) |
| USER B | | D(V1) | |

FIG. 11

| TIME ZONE | 7:00 ~ 12:00 | 12:01 ~ 17:00 | 17:01 ~ 19:00 |
|---|---|---|---|
| USER A | D(V1) | X | D(V1→V2) |
| USER B | X | S(V1) | X |

VEHICLE, SERVER, AND METHOD FOR CONTROLLING THE SAME

CROSS-REFERENCE TO RELATED APPLICATION(S)

This application claims priority to and the benefit of Korean Patent Application No. 10-2019-0039993, filed on Apr. 5, 2019, the disclosure of which is incorporated by reference in its entirety.

TECHNICAL FIELD

The present disclosure relates to a shareable vehicle that controls operations of various devices provided within the vehicle, a server capable of communicating with the vehicle, and a method for controlling the vehicle.

BACKGROUND

Recently, with the introduction of vehicle sharing systems, one vehicle is used by a plurality of people rather than by a single person. The vehicle sharing system is a concept of service which allows members in a vehicle sharing group to use vehicles owned and managed by corporations, public institutions, individuals, and the like. Since the costs necessary for purchasing, maintaining, and managing the vehicles and various associated tasks in the vehicle sharing system are provided and performed through a corporate management system rather than by an individual driver, the vehicle sharing systems are becoming increasingly prevalent in urban areas.

In particular, the vehicle sharing system includes a system in which a user performs registration with a vehicle sharing company and uses a vehicle parked in a predetermined location. The vehicle is typically accessed using an electronic key input into an integrated circuit (IC) card or a terminal device. However, due to this electronic key system, the risk of theft, unauthorized use, or the like of the vehicle increases. The vehicle used for the vehicle sharing system has a limitation in utilizing the vehicle since it is only used for travelling purposes.

SUMMARY

Therefore, the present disclosure provides a vehicle which authorizes control authority for at least one of functions performed in the vehicle to a first user, and authorizes control authority for remaining functions to a second user, a server that communicates with the vehicle, and a method of operating the vehicle. Another aspect of the present disclosure provides a server which assigns a vehicle based on travelling information of a first user and transporting goods information of a second user. Additionally, the present disclosure provides a server which assigns a vehicle based on schedule information of a user.

In accordance with one aspect of the present disclosure, a vehicle may include: a storage configured to store information regarding a plurality of uses and at least one function that corresponds to each of the uses; a communication device configured to communicate with at least one of a server and a terminal for a user; and a controller, configured to, when use information of a vehicle sharing service is received by the communication device, identify the use corresponding to the use information of the received vehicle sharing service, identify at least one function that corresponds to the identified use based on the information stored in the storage, and authorize control corresponding to the identified at least one function.

The vehicle may further include an input configured to receive user input. The controller may be configured to execute the at least one function based on the user input corresponding to the at least one function among the user inputs received by the input. When a signal corresponding to control authority information stored in the terminal for the user is received by the communication device, the controller may be configured to execute the at least one function based on the received signal.

The storage may be configured to store control authority information transmitted by the server and terminal information of the terminal for the user. When communication with the terminal for the user is performed, the controller may be configured to activate the operation of at least one electronic device for performing the at least one function based on the stored control authority information. The use information of the vehicle sharing service may include user information of each time zone and the use of the vehicle for each of the users. The user information may include at least one of identification information of the user and terminal information of the terminal for the user.

In response to determining that a plurality of the users are assigned at the same time, the controller may be configured to identify each of the uses of the vehicle for the plurality of users, and authorize control of different functions for each of the users based on the use of the vehicle for each of the users. The controller may be configured to perform the user authentication for each of the users, and when the user authentication is completed, authorize control of different functions for each of the users. The use of the vehicle may include at least one of travelling, storing goods, transporting goods, and resting.

When the identified use of the vehicle is storing goods, the controller may be configured to authorize operation of a locking member for locking and unlocking a trunk. When the identified use of the vehicle is travelling, the controller may be configured to authorize operation of all electronic devices in the vehicle, and when the identified use of the vehicle is resting, may be configured to authorize operation of one of the electronic devices for door opening and closing and at least one of the electronic devices for rest of the user.

Additionally, the controller may be configured to perform authentication of a first user, and when the use of the vehicle by the first user is travelling, detect whether the use of the vehicle is being used by a second user for transporting goods. When the use of the vehicle is being used by the second user for transporting goods, the controller may be configured to limit the operation of a locking member for locking and unlocking a trunk to the first user, and authorize operation of the remaining electronic devices to the first user. The controller may be configured to perform authentication of a first user, and when the use of the vehicle by the first user is resting, detect whether the use of the vehicle is being used by a second user for transporting goods. When the use of the vehicle is being used by the second user for transporting goods, the controller may be configured to limit operation of a locking member for locking and unlocking a trunk and a driving device for traveling to the first user, and authorize operation of remaining electronic devices to the first user.

In accordance with another aspect of the present disclosure, a server may include: a communication device configured to communicate with a vehicle and a terminal for a user; and a controller, configured to, when at least one of schedule information of the user and use information of a vehicle sharing service is received by the terminal for the user, assign the vehicle to be provided with the vehicle sharing service to the user based on the received at least one piece of schedule information and position information of a plurality of the vehicles, operate the communication device to transmit identification information of the assigned vehicle to the terminal for the user, and operate the communication device to transmit user information to the assigned vehicle.

The use information of the vehicle sharing service may include user information of each time zone, and a use of the vehicle, a use start time, a use end time, a ride position and a return position for each of the users. When assigning the vehicle, the controller, may be configured to identify the users with the same time zone using the vehicle sharing service, identify at least two of the users whose use of the vehicle are different among the identified users, and assign the same vehicle to the identified at least two users.

The controller may be configured to operate the communication device to transmit authentication information for authentication between the assigned vehicle and the terminal for the user, and control authority information corresponding to the use of the vehicle to the terminal for the user. In addition, the controller may be configured to operate the communication device to transmit at least one of the use information of the vehicle for each of the users and control authority information for each of the users to the assigned vehicle. When location information and the identification information of at least one of the vehicles is received by the at least one vehicle, the controller may be configured to operate a storage to store the received location information and the identification information of the at least one vehicle.

In accordance with another aspect of the present disclosure, a method for controlling a vehicle may include: identifying a use corresponding to use information of a vehicle sharing service, when the use information of the vehicle sharing service is received by a communication device; identifying at least one function corresponding to the identified use based on information stored in a storage; authorizing control corresponding to the identified at least one function; and limiting operation of the remaining functions.

The authorizing control corresponding to the identified at least one function may include: performing user authentication; executing the at least one function based on a user input corresponding to the at least one function among user inputs received by an input, when the user authentication is successful; and executing, when a signal corresponding to control authority information stored in the terminal of the user is received, the at least one function based on the received signal.

The method may further include: detecting, in response to determining that a plurality of users are assigned at the same time, the use of the vehicle for the plurality of users; and authorizing control of different functions for each of the users based on the use of the vehicle for each of the users. Additionally, the method may include: performing user authentication; identifying the use of the vehicle corresponding to the authenticated user; and outputting a warning message, when a control command for the function other than the at least one function corresponding to the identified use is received.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIGS. 7, 8, 9, 10, and 11 are exemplary views illustrating a vehicle assignment in the server communicating with the vehicle according to an exemplary embodiment;

DETAILED DESCRIPTION

Figure 1:
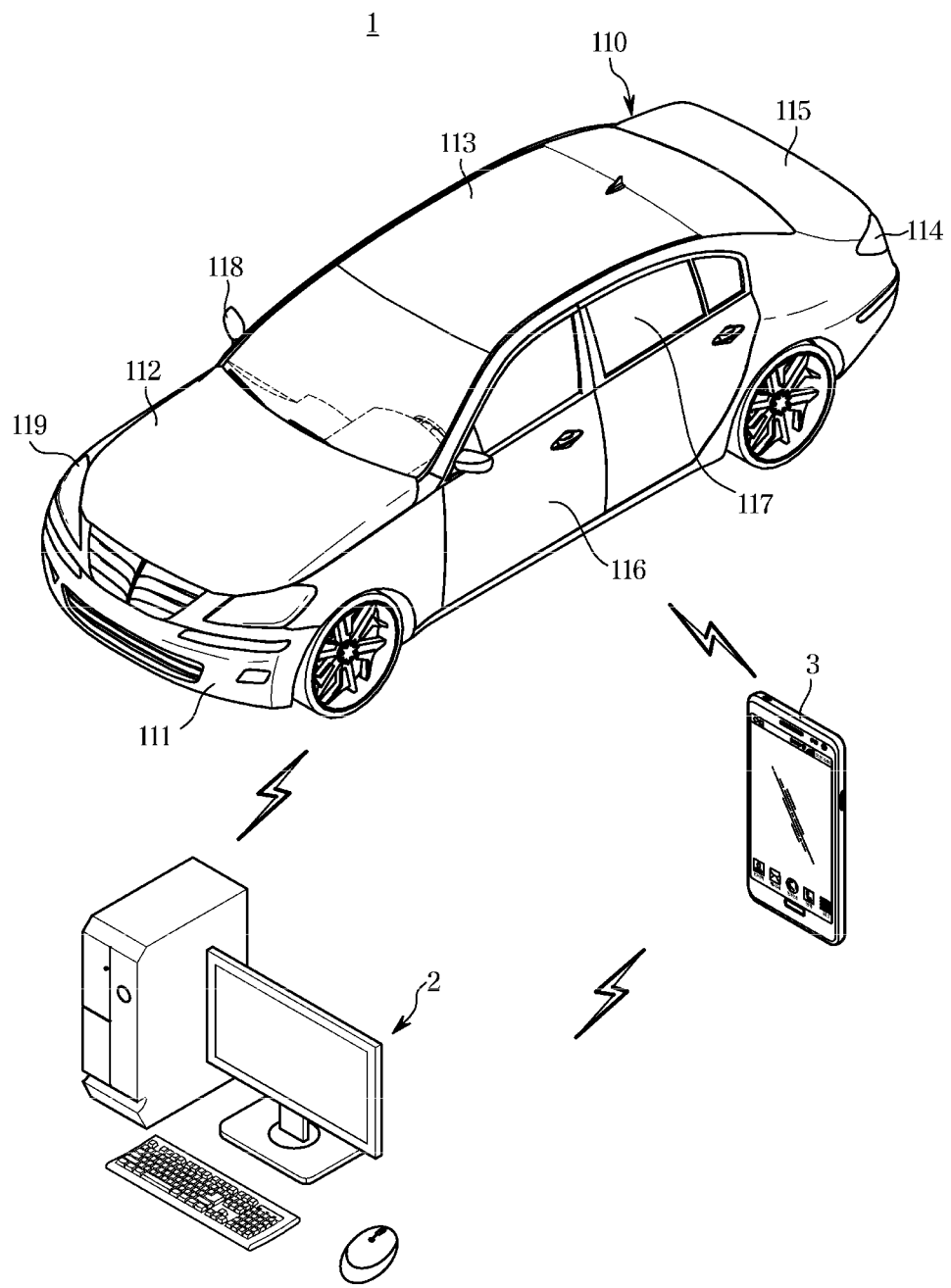
FIG. 1 is an exemplary view illustrating a vehicle sharing system including a server, a terminal, and a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In the following description, like reference numerals refer to like elements throughout the specification. Well-known functions or constructions are not described in detail since they would obscure the one or more exemplary embodiments with unnecessary detail. Terms such as "unit," "module," and "device" may be embodied as hardware or software. According to exemplary embodiments, a plurality of "units," "modules," and "devices" may be implemented as a single component or a single "unit," "module," and "device" may include a plurality of components.

It will be understood that when an element is referred to as being "connected" to another element, it can be directly or indirectly connected to the other element, wherein the indirect connection includes connection via a wireless communication network. Also, when a part "includes" or "comprises" an element, unless there is a particular description contrary thereto, the part may further include other elements, not excluding the other elements.

It will be understood that, although the terms first, second, etc. may be used herein to describe various elements, these elements should not be limited by these terms. These terms are only used to distinguish one element from another. As used herein, the term "and/or" includes any and all combinations of one or more of the associated listed items. As used herein, the singular forms "a," "an" and "the" are intended to include the plural forms as well, unless the context clearly indicates otherwise. An identification code is used for the convenience of the description but is not intended to illustrate the order of each step. Each of the steps may be implemented in an order different from the illustrated order unless the context clearly indicates otherwise.

Reference will now be made in detail to exemplary embodiments of the present disclosure, examples of which are illustrated in the accompanying drawings. FIG. 1 is an exemplary view illustrating a vehicle sharing system including a server and a terminal communicating with a vehicle according to an exemplary embodiment.

A vehicle 1 may include a body having an interior 110 and an exterior, and a chassis forming portions other than the body and in which mechanical devices required for traveling are installed. As shown in FIG. 1, an exterior of the body 110 may include a front panel 111, a hood 112, a roof panel 113, a rear panel 114, a trunk 115, front, rear, right and left doors 116, and window glass 117 disposed in the front, rear, right and left doors 116 to be openable and closable.

Each of the doors 116 and the trunk 115 may include a first locking member and a second locking member (150, 160 in FIG. 2) for opening and closing, and locking and unlocking of the doors 116 and the trunk 115 in the vehicle. The vehicle 1 may include side mirrors 118 that provide a driver with rear fields of view of the vehicle 1, and may further include mirror control members (not shown) that folds or unfolds each of the side mirrors 118. The vehicle 1 may include a plurality of lamps 119 to enable the driver to view information of surroundings while maintaining a forward gaze, and to perform a function of signaling or communicating with other vehicles and pedestrians.

The interior part of the body includes seats on which passengers may be seated, and a heat unit configured to receive a user input, and configured to display operation information of at least one electronic device. The driver and the passengers may be seated on the seats which may include a driver's seat for the vehicle driver, passenger seats for fellow passengers, and a rear seat arranged in the rear of the vehicle 1. Each of the seats may include a seat adjusting member (see 130 of FIG. 2) capable of adjusting a distance and height with respect to a dashboard, and angle of a backrest. Each of the seats may also include at least one of a heating wire and a ventilation device.

A head unit may include an input configured to receive a command and the operation information of the user for operating the at least one electronic device, and a display configured to display operation information to be input by the user and to display information regarding a function being performed by the vehicle 1. For example, the input may be configured to receive the user input at an audio device and an air conditioner, and may be configured to receive at least one of an open/close command of the trunk and a lock/unlock command of the trunk, an open/close command of at least one of the doors, a lock/unlock command of at least one of the doors, and receive an operation command and operation information of a terminal for the vehicle.

The user input to the audio device and the air conditioner may be an indoor target temperature, air volume information of the air conditioner, and audio volume and radio channel information. The input may be provided on a center fascia of the vehicle. The input provided on the center fascia and the head unit may include at least one of a jog dial type, a button type, a key type, a switch type, and a touch pad type.

The vehicle 1 may further include a multi terminal for charging a terminal 3 for the user and performing wired communication with the terminal 3 for the user. The vehicle 1 may include a terminal (see 120 in FIG. 2). The terminal may be an audio, visual, and navigation (AVN) system configured to perform an audio function, a video function, and a navigation function. The terminal for the vehicle may be provided as a touch screen obtained by integrating a touch panel and a display panel. The terminal for the vehicle may include a display panel. In particular, the terminal may be configured to receive the operation command and the operation information through the input provided in the center fascia or the head unit. The terminal may be disposed in the dashboard in a stationary manner or a buried manner.

The vehicle 1 may further include a communication device (refer to a first communication device 180 in FIG. 2) configured to perform communication with at least one of the server, the terminal for the user, and a global positioning system (GPS) satellite. The communication device 180 may include one or more components configured to allow communication with a controller 190, a terminal, and an external device. The communication device may include at least one of a short-range communication module, a wired communication module, and a wireless communication module.

The short-range communication module may include a variety of short-range communication modules, configured to transmit and receive a signal using a wireless communication module in the short range, e.g., Bluetooth module, Infrared communication module, Radio Frequency Identification (RFID) communication module, Wireless Local Access Network (WLAN) communication module, NFC communication module, and ZigBee communication module.

The wired communication module may include a variety of wired communication modules, e.g., Controller Area Network (CAN) communication module, Local Area Network (LAN) module, Wide Area Network (WAN) module, and Value Added Network (VAN) module or a variety of cable communication modules, e.g., Universal Serial Bus (USB), High Definition Multimedia Interface (HDMI), Digital Visual Interface (DVI), recommended standard 232 (RS-232), and plain old telephone service (POTS).

The wireless communication module may include a wireless communication module supporting a variety of wireless communication methods, e.g., Radio Data System-Traffic Message Channel (RDS-TMC), Digital Multimedia Broadcasting (DMB), Wi-Fi module, Wireless broadband module, Global System for Mobile (GSM) Communication, Code Division Multiple Access (CDMA), Wideband Code Division Multiple Access (WCDMA), Time Division Multiple Access (TDMA), and Long Term Evolution (LTE).

Further, the vehicle may be configured to transmit current position information to a server 2. The vehicle may also be configured to transmit information such as a time at which the vehicle stops at the current position, a start time and a use end time of a vehicle sharing service to the server 2. The chassis in the vehicle may be a frame configured to support the body. The chassis in the vehicle may further include a power plant, a braking device, and a steering device configured to apply a driving force, a braking force, and a steering force to front, rear, right, and left wheels and may further include a suspension device, a transmission, and the like.

When the use of the vehicle is storing goods, after performing a user authentication, the vehicle may be configured to authorize control authority of the trunk to the user. At this time, the control authority for the remaining functions that may be executed in the vehicle may be limited to the user. When the use of the vehicle is storing goods and an external illuminance is less than or equal to a reference illuminance, the vehicle may be configured to authorize control authority of the lamp to the user. At this time, the control authority for the remaining functions that may be executed in the vehicle may be limited to the user.

When the use of the vehicle is resting, after performing the user authentication, the vehicle may be configured to authorize the control authority of the seat adjustment member, the heating wire of the seat, the air conditioner, a radio, the door, the window glass, the communication device and the terminal for the vehicle to the user. At this time, the control authority for the remaining functions that may be executed in the vehicle may be limited to the user. The user may perform meetings, media viewing and resting within the vehicle.

When the use of the vehicle is travelling, after performing the user authentication, the vehicle may be configured to authorize the control authority of all electronic devices and all functions, which are executable in the vehicle to the user. For example, the vehicle may be configured to authorize the operation authority of the first locking member, the second locking member, the power plant, the braking device, the steering device and the suspension device, the transmission, an opening and closing device for opening and closing the window glass 117, an on/off device of the lamp 119, and the mirror control members of the side mirrors 118 to the user.

When the use of the vehicle is travelling, and another user's goods are stored in the trunk, the vehicle may be configured to limit the control authority of the trunk after the user authentication of one of the users, and authorize the control authority of the remaining functions to the user. The user authentication may include authentication of the terminal for the user. The user authentication may include authenticating user information input to the terminal for the vehicle.

When the use of the vehicle by the user is storing goods in the state of the traveling and resting, the vehicle may be configured to transmit information to the server in the trunk use. In other words, the vehicle may be configured to identify a function used by the user corresponding to the operation state of the electronic device, and identify the use of the vehicle corresponding to the identified function. In response to determining that the vehicle is being used for another use of the vehicle other than the use of the vehicle selected by the user, the vehicle may be configured to transmit notification information to the terminal 3 for the user via the server 2, and directly transmit the notification information to the terminal 3 for the user, and output the information through the terminal 120 for the vehicle.

Figure 2:
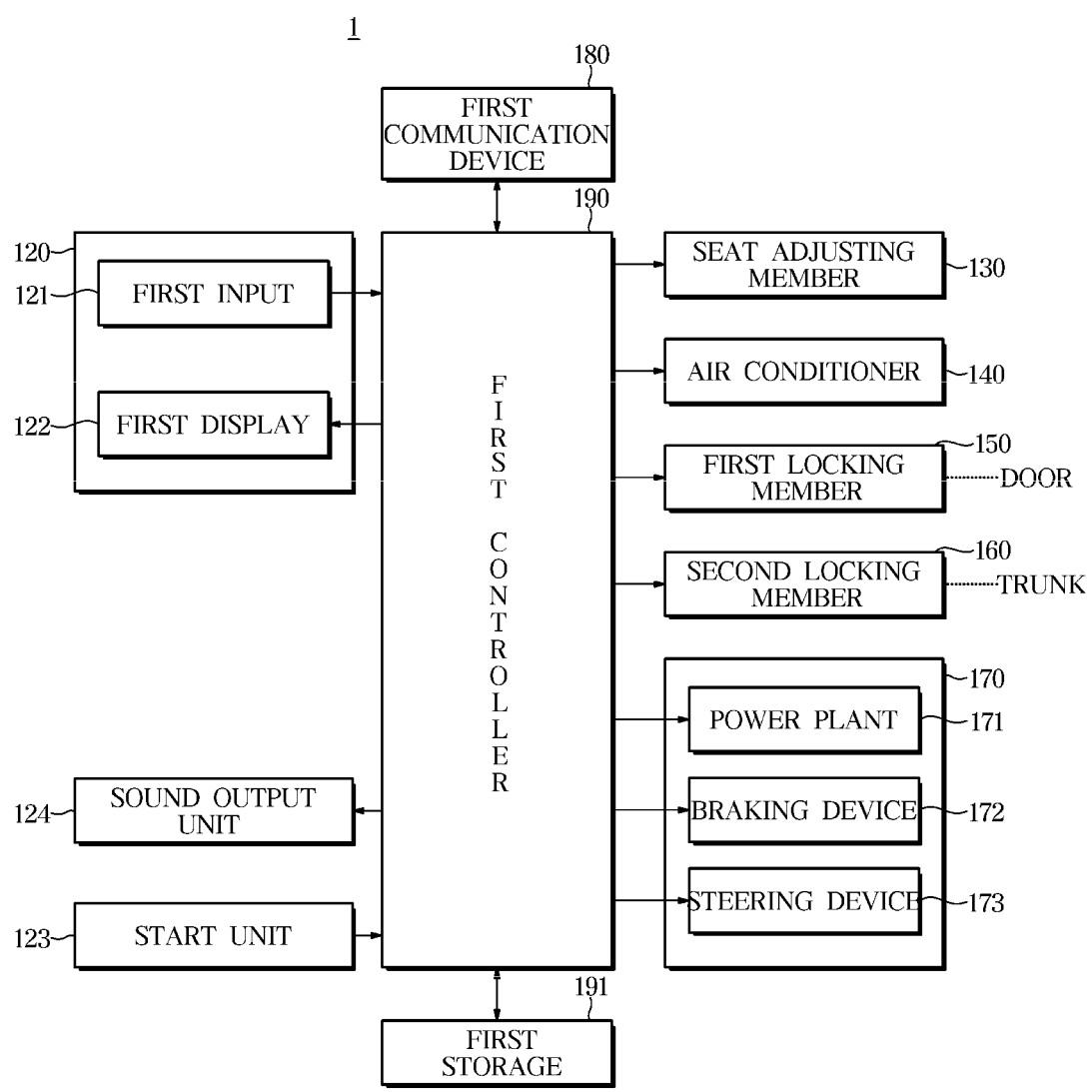
FIG. 2 is a block diagram illustrating the vehicle according to an exemplary embodiment.

The vehicle may further include a start button of a start unit (See 123 in FIG. 2). In response to determining that the control authority for traveling has been allocated to the user, the vehicle may be configured to activate the start button, and when the start button is turned on, execute start-up of the vehicle. When the start button is turned on during communication with the terminal 3 for the user that has been authenticated, the vehicle may be configured to execute the start-up of the vehicle. The communication with the terminal 3 for the user may be performed by performing authentication with the terminal 3 for the user, and identifying an electronic key stored in the terminal 3 for the user upon completion of authentication.

When performing the authentication with the terminal 3 for the user, the vehicle may be configured to identify information regarding the control authority that corresponds to the use of the vehicle matching the user's purpose for the vehicle. The server 2 may be configured to store the user information, user terminal information, and vehicle information. For example, the user information may be at least one of user's identification of the user registered in the server, and identification information of the terminal 3 for the user. The identification of the user registered in the server and the identification information of the terminal for the user may be information registered through an application (app) installed in the terminal for the user.

In particular, the user information may include the user's name registered through the vehicle sharing application, the user's home address, the user's email address, the user's identification number (e.g., a resident number or a date of birth), the user's credit card number or account number of bank for performing payment for vehicle sharing use, and driver's license information of the user.

The identification information of the terminal 3 may be unique identification information of the terminal differentiated from those of another terminal, and may include at least one of a telephone number of the terminal and a Wi-Fi MAC address, a serial number, and an IMEI of the terminal. The identification information of the terminal 3 may be Bluetooth identification information (BTID). The user information provided from the terminal may be is user information registered in the application for vehicle sharing. The vehicle information may include a vehicle model, a vehicle type, identification information (license plate), a power generation system (e.g., hybrid, electric, internal combustion engine, hydrogen, etc.) and a shift mode.

The server 2 may be configured to communicate with the terminal 3 for the user, and communicate with the vehicle 1. The server 2 may be configured to perform vehicle assignment based on the use information of the vehicle sharing service received by the terminal 3, or perform vehicle assignment based on schedule information of the user. The use information of the vehicle sharing service or the schedule information of the user may include a use time of the vehicle, the use of the vehicle, and the like, and may include a use position of the vehicle. The use time of the vehicle may include a use start time and a use end time. The use position of the vehicle may include a riding position and a return position. The riding position may be a start position. The return position may be a destination position.

In addition, the server 2 may be configured to transmit the user information, the terminal information and the use information of the vehicle sharing service to the assigned vehicle, transmit the identification information of the assigned vehicle to the terminal 3 for the user, and transmit the authentication information for using the assigned vehicle to the terminal 3 for the user. The server 2 may then be configured to transmit control authority information of the vehicle for each of the users to the vehicle 1, and transmit the control authority information of the vehicle to the terminal 3 for the user. The server 2 may also be configured to transmit cost information for the vehicle sharing service to the terminal for the user or the vehicle.

The terminal 3 may be configured to receive and store the electronic key that corresponds to the control authority information of the vehicle. In other words, the electronic key may include the control authority information for operating at least one of the electronic devices of the vehicle for performing the function corresponding to the use of the vehicle. For example, the terminal 3 may be configured to change the door of the vehicle to the locked state or the unlocked state by remotely operating the first locking member using the stored electronic key. The terminal 3 may be configured to change the trunk of the vehicle to the locked state or the unlocked state by remotely operating the second locking member using the stored electronic key. The terminal 3 may be configured to operate various electronic devices provided within the vehicle using the stored electronic key. The user terminal 3 may be realized as a computer or a portable terminal capable of connecting to the vehicle and the server over a network.

In particular, the computer may include, for example, a notebook, a desktop, a laptop, a tablet personal computer (PC), a slate PC, and the like in which a web browser is installed, and the portable terminal device includes, for example, all types of handheld-based wireless communication devices such as a personal communication system (PCS), a global system for mobile communications (GSM), a personal digital cellular (PDC), a personal handyphone system (PHS), a personal digital assistant (PDA), international mobile telecommunication (IMT)-2000, code division multiple access (CDMA)-2000, W-code division multiple access (W-CDMA), a wireless broadband Internet (WiBro) terminal, a smartphone, and a wearable device such as a watch, a ring, a bracelet, an ankle, a necklace, glasses, contact lenses, or a head-mounted-device (HMD) as a wireless communication device with guaranteed portability and mobility.

Figure 3:
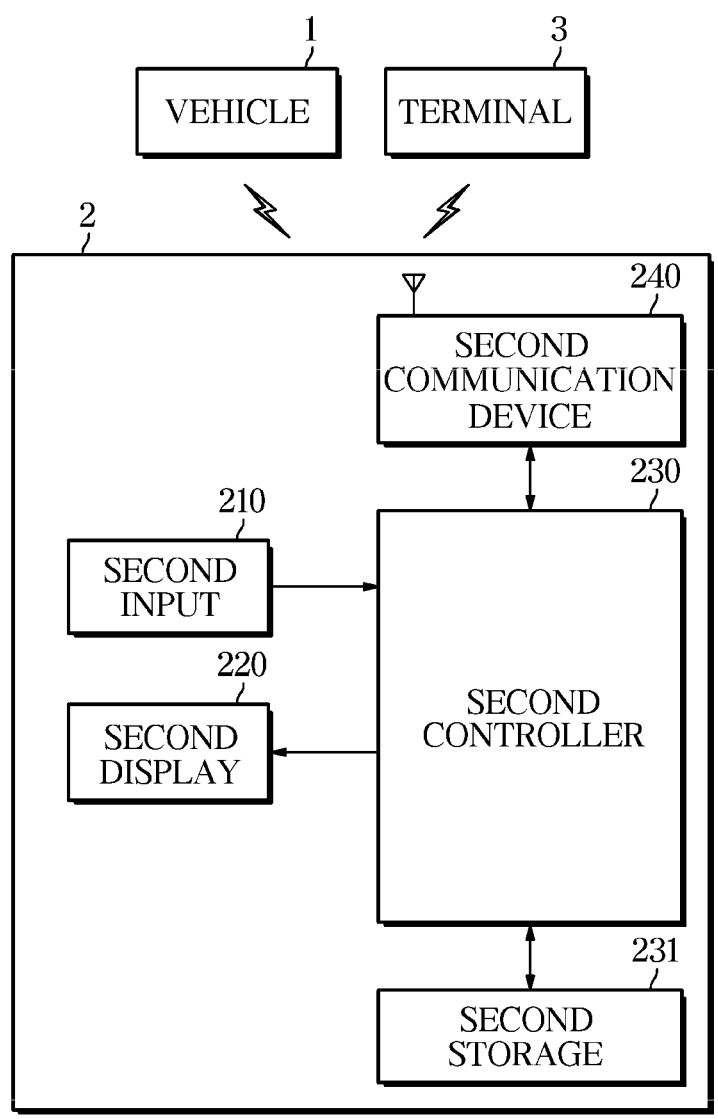
FIG. 3 is a block diagram illustrating the server communicating with the vehicle according to an exemplary embodiment.
Figure 4:
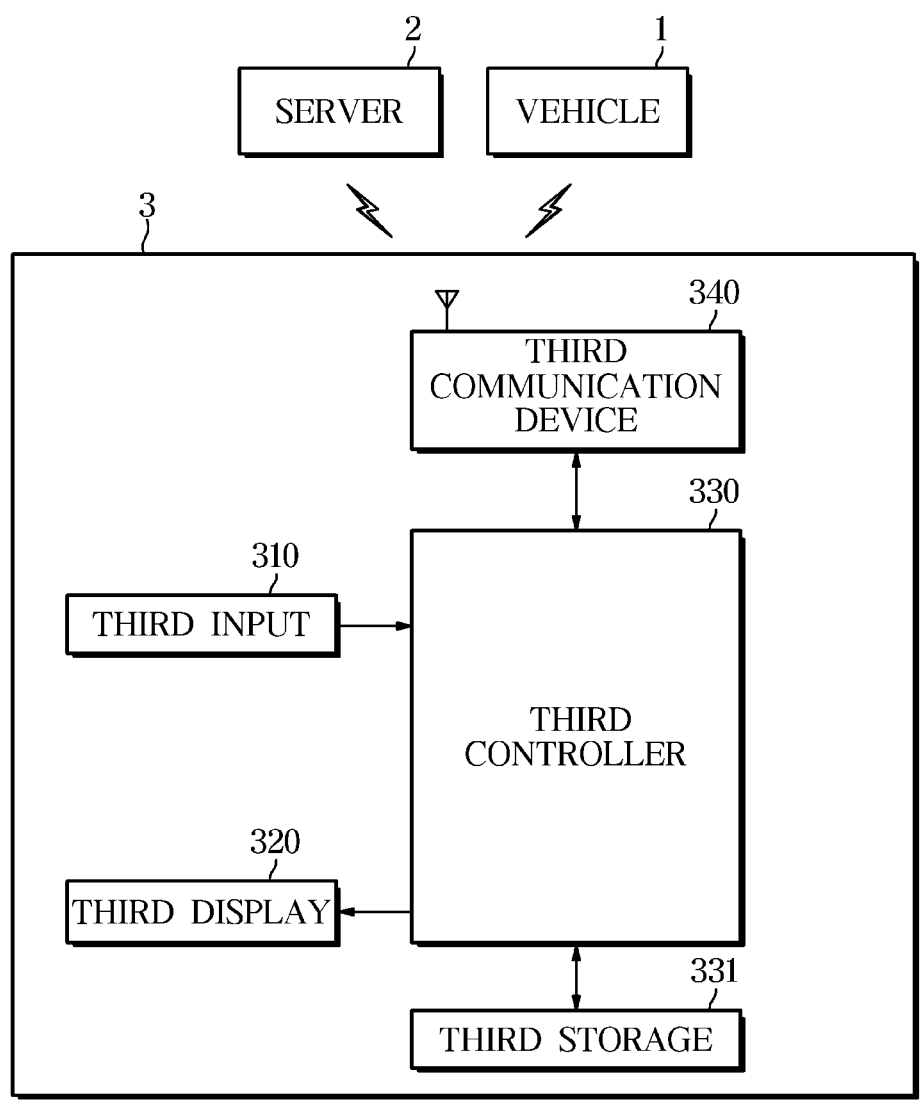
FIG. 4 is a block diagram illustrating the terminal communicating with the vehicle according to an exemplary embodiment.

FIG. 2 is a block diagram illustrating the vehicle according to an exemplary embodiment. FIG. 3 is a block diagram illustrating the server communicating with the vehicle according to an exemplary embodiment. FIG. 4 is a block diagram illustrating the terminal communicating with the vehicle according to an exemplary embodiment.

In the exemplary embodiment, to distinguish between constituent parts of the vehicle 1 and constituent parts of the server 2 and the terminal 3 which have the same name, "first," "second," and "third" are assigned to the constituent parts of the vehicle 1, the constituent parts of the server 2, and the constituent parts of the terminal 3 which have the same name, respectively. To distinguish between a terminal provided in a vehicle and a terminal owned by a user, the terminal provided in the vehicle is described as the vehicle terminal, and the terminal owned by the user is described as the user terminal.

As illustrated in FIG. 2, the vehicle 1 may include the vehicle terminal 120, the seat adjusting member 130, an air conditioner 140, the first locking member 150, the second locking member 160, a driving device 170, the first communication device 180, the first controller 190, and a storage 191.

The vehicle terminal 120 may include a first input 121 and a first display 122. The first input 121 may be configured to receive an operation command of at least one of functions that may be performed by the vehicle terminal 120. For example, the first input 121 may be configured to receive an operation command such as an audio function, a radio function, a navigation function, a video function, an Internet search function, a call function, and a broadcast (DMB) function, and receive operation information for performing an operation of a function to which an operation command is input.

The first input 121 may be configured to receive an operation command of at least one of the functions that may be performed in the vehicle. For example, the operation command of at least one of the functions that may be performed in the vehicle may include an indoor target temperature and air volume information of the air conditioner, an on/off command and a temperature of the seat heating wire, an on/off command of the ventilation device, and a ventilation command for indoor air.

Additionally, the first input 121 may be configured to receive the user information, the use information of the vehicle sharing service, and the schedule information. The first display 122 may be configured to display at least one of the use information of the vehicle sharing service and the schedule information of the user received through the user terminal 3, display one of pairing success information and pairing failure information with the user terminal 3, and display authentication success information and authentication failure information of the user terminal 3. The first display 122 may also be configured to display use restriction information of the vehicle sharing service when the authentication of the user terminal 3 fails.

The first display 122 may be configured to display the use time of the vehicle sharing service, the cost, the use of the vehicle of each time zone, and the return position. The first display 122 may also be configured to display the control authority information for at least one electronic device or at least one function corresponding to the use of the vehicle for the purpose of using the user's vehicle. The control authority information may include a function for which control is authorized and a function for which control is limited. The control authority information may include at least one electronic device that is allowed to be operated and at least one electronic device for which operation is limited.

Further, the first display 122 may be configured to display at least one of the user information received from the server 2 and the terminal information of the user terminal 3. The first display 122 may be configured to display at least one of the user information currently used by the vehicle sharing service and the terminal information of the user terminal 3. The vehicle may further include the start unit 123 configured to receive a start command of the vehicle, and a sound output unit 124 configured to output sound. In particular, the sound output unit 124 may be at least one speaker.

The seat adjusting member 130 may be configured to adjust a position of the seat in response to a control command of the first controller 190, and the air conditioner 140 may be configured to adjust a temperature of air in an indoor space of the vehicle in response to a control command of the first controller 190 to maintain the temperature of the indoor space at the target temperature selected by the user. The first locking member 150 causes the door 116 to be locked or unlocked in response to a control command of the first controller 190. The second locking member 160 causes the trunk 115 to be locked or unlocked in response to a control command of the first controller 190.

The start unit 123 and the sound output unit 124 may be operated based on the control authority information of the first controller 190, and may be limited based on the control authority information of the first controller 190. The vehicle terminal 120, the seat adjusting member 130, the air conditioner 140, the first locking member 150 and the second locking member 160 may be operated based on the control authority information of the first controller 190, and may be limited based on the control authority information of the first controller 190.

The driving device 170 may include a plurality of mechanical devices and electronic devices that allow the traveling, steering, braking, and stopping of the vehicle to be performed in response to a control command of the first controller 190, and stable traveling to be performed in response to a control command of the first controller 190. The driving device 170 may include a power plant 171, a braking device 172, and a steering device 173, and may further include a suspension device, a transmission, and various safety devices. The driving device 170 may be authorized to operate or may be limited to operate at least one device based on the control authority information of the first controller 190.

The vehicle may further include an opening and closing device for opening and closing the window glass 117, an on-off device of the lamp 119, and the like. The on/off device and the opening and closing device may be authorized or limited in the operation based on the control authority information of the first controller 190. The first communication device 180 may be configured to communicate with the user terminal 3 and communicate information with the user terminal 3 through communication with the user terminal 3. The first communication device 180 may be configured to receive the information corresponding to the electronic key, the pairing information, and the identification information of the user terminal 3 for authentication of the user terminal 3 from the user terminal 3.

The first communication device 180 may be configured to transmit a pairing request signal based on a control command of the first controller 190, may be configured to transmit a request signal for providing the user information registered in the application, and may be configured to transmit a request signal for providing the identification information of the user terminal 3. The first communication device 180 may further include a GPS receiver configured to receive signals from a plurality of satellites and identify a current position based on the received signals. The first communication device 180 may be configured to receive the user information from the server 2.

For example, the server 2 may be a server of a vehicle sharing company performing a vehicle sharing business and a server configured to manage and supervise vehicle sharing of all the vehicle sharing companies and manage and supervise registered members. The server 2 may be configured to store the application for vehicle sharing and provide the stored application to users. When the vehicle is assigned to at least one user by the server 2, the first communication device 180 may be configured to automatically receive the user information for the time zone and the use information of the vehicle from the server 2. At this time, the first communication device 180 may be configured to receive the electronic key information for authentication of the user terminal 3 from the server 2.

In particular, the first communication device 180 may be configured to receive the electronic key information for user authentication from the user terminal 3. The first communication device 180 may be configured to transmit the current position information of the vehicle to the server 2 when the vehicle sharing service is terminated. The first communication device 180 may also be configured to transmit the user information, the use information of the vehicle sharing service and the schedule information of the vehicle sharing service received by the user terminal 3 to the server 2.

The first communication device 180 may be configured to transmit the user information, the use information of the vehicle sharing service and the schedule information of the vehicle sharing service received by the vehicle terminal 120 to the server 2. The first communication device 180 may then be configured to receive the cost information for the vehicle sharing service received by the server 2. When the user information and the use information of the vehicle sharing service are received from the server 2 via the first communication device 180, the first controller 190 may be configured to operate the storage 191 to store the received user information and the use information of the vehicle sharing service.

When the user information and the use information of the vehicle sharing service are received from the user terminal 3 via the first communication device 180, the first controller 190 may be configured to operate the storage 191 to store the received user information and the use information of the vehicle sharing service. Additionally, when the user information and the use information of the vehicle sharing service are received by the first input 121 of the vehicle terminal 120 via the first communication device 180, the first controller 190 may be configured to operate the storage 191 to store the received user information and the use information of the vehicle sharing service.

The first controller 190 may be configured to obtain the use information of the vehicle of each time zone based on the use information of the vehicle sharing service, and obtain a function that corresponds to the obtained use information of the vehicle. The first controller 190 may then be configured to operate the storage 191 to store the user information or the terminal information for each time zone, and operate the storage 191 to store the control authority information corresponding to each function for each time zone.

In other words, the first controller 190 may be configured to operate the storage 191 to store the use information and the function of the vehicle for each time zone. At this time, the first controller 190 may be configured to operate the storage 191 to store the usable user information or the terminal information for each time zone. The first controller 190 may be configured to obtain the control authority information for each function based on the use information of the vehicle for each time zone, authorize control authority for at least one function in each time zone, and limit the control authority for the remaining functions.

More specifically, the first controller 190 may be configured to authorize the control authority of at least one function and limit the control authority of the remaining functions when communicating with the user terminal 3. The control authority of the remaining functions may be authorized to other users. When the user information input to the first input 121 and the user information transmitted from the server are the same, the first controller 190 may be configured to authorize the control authority of the at least one function to the user based on the use information of the vehicle sharing service, and limit the control authority of the remaining functions.

The first controller 190 may have the control authority only for the user information or functions permitted through the user terminal. The first controller 190 may be configured to receive the information that corresponds to the electronic key from the user terminal 3, and obtain the control authority for each function or the control authority information for each electronic device from the information corresponding to the received electronic key.

When information corresponding to the electronic key is received by the user terminal 3, the first controller 190 may be configured to compare the received information with information of a pre-stored electronic key, and when the received information and the information of the pre-stored electronic key are the same, determine that the authentication is successful, and authorize the control authority of at least one function or the control authority of all control functions of the functions executable in the vehicle.

In other words, the first controller 190 may be configured to operate the electronic device provided within the vehicle so that only the function corresponding to the user information or the terminal information of the user terminal 3 is performed. For example, when the use of the vehicle for the user is resting, the first controller 190 may be configured to detect whether there is another user who reserved the use of the vehicle in the same time zone as storing goods for use of the trunk. In response to determining that there is another user reserving the use of the vehicle as storing goods, may be configured to limit the control authority for locking and unlocking the trunk, and authorize the control authority for electronic devices related to the rest of the user, such as the vehicle terminal, the air conditioner, the seat, the doors, the window glass and the sound output unit.

When the use of the vehicle for the user is storing goods, the first controller 190 may be configured to authorize the control authority for locking and unlocking the trunk, and limit the control authority for the remaining electronic devices. When the use of the vehicle for the user is travelling, the first controller 190 may be configured to detect whether there is another user who reserved the use of the vehicle in the same time zone as transporting goods. In response to determining that there is another user reserving the use of the vehicle as transporting goods, may be configured to limit the control authority for locking and unlocking the trunk, and authorize the control authority for the remaining electronic devices. In response to determining that there is no other user reserving transporting goods, the first controller 190 may be configured to authorize the control authority for all the electronic devices in the vehicle.

The first controller 190 may be configured to identify the user when an unlock signal of the door is received or communicates with the user terminal and detect whether the identified user is the reserved user at the current time. In response to determining that the user is the user who has been using the vehicle sharing service, identified the use information of the vehicle sharing service, the first controller 190 may be configured to authorize the control authority for at least one function based on the identified use information of the vehicle sharing service.

When a signal corresponding to the control authority information stored in the user terminal is received via the first communication device, the first controller 190 may be configured to execute the at least one function based on the received control authority information. The first controller 190 may be configured to determine whether the user input received by the first input 121 is a user input corresponding to at least one function for the use of the vehicle, and in response to determining that the user input corresponds to the at least one function for the use of the vehicle, execute the at least one function based on the user input.

When communicating with the user terminal, the first controller 190 may be configured to activate the operation of the at least one electronic device to perform at least one function corresponding to the use of the vehicle based on the control authority information stored in the first storage. When determining that the identified user is the reserved user at the current time, the first controller 190 may be configured to compare the user information input to the first input 121 with the user information stored in the first storage 191.

When determining that the identified user is the reserved user at the current time, the first controller 190 may be configured to compare the terminal information of the user terminal in communication with the vehicle and the terminal information of the user terminal stored in the first storage 191. When a request command of the vehicle sharing service is received by the first input, the first controller 190 may be configured to transmit a user information providing request signal to the user terminal 3, and when the user information is received by the user terminal 3, operate the storage to store the received user information.

When the use information of the vehicle sharing service is received by the first input, the first controller 190 may be configured to transmit the use information of the vehicle sharing service, current location information and the user information to the server 2. When the vehicle return information is received through the application of the user terminal or end information of the vehicle sharing service is received through the first input 121, the first controller 190 may be configured to delete the stored user information.

The first controller 190 may be implemented using a memory (not shown) configured to store data for algorithms to operate elements of the vehicle 1 or programs constructed from algorithms, and a processor (not shown) configured to execute the operation by using data stored in the memory. Particularly, the memory and the processor may be implemented using separate chips or integrated into a single chip.

The first storage 191 may be configured to store the user information and the use information of the vehicle. In particular, the first storage 191 may be configured to store the use information of the vehicle sharing service. The use information of the vehicle sharing service may include the user information of each time zone, the use information of the vehicle, the start position, and the destination position. The first storage 191 may be configured to store the schedule information of the user. The first storage 191 may also be configured to store the function of each use of the vehicle, and store information of the electronic device for performing the function of each use of the vehicle The first storage 191 may be implemented using at least one of a non-volatile memory element, e.g., a cache, Read Only Memory (ROM), Programmable ROM (PROM), Erasable Programmable ROM (EPROM), Electrically Erasable Programmable ROM (EEPROM) and flash memory; a volatile memory element, e.g., Random Access Memory (RAM); or a storage medium, e.g., Hard Disk Drive (HDD) and CD-ROM. The implementation of the memory is not limited thereto.

Each of the memories may be a memory that is implemented as a chip separate from the above mentioned processor related to the first controller 190, or may be implemented on a single chip with a processor. At least one constituent element may be added or deleted to correspond to the performance of the constituent elements of the vehicle shown in FIG. 2. Furthermore, it will be readily understood by those skilled in the art that the mutual positions of the constituent elements can be changed to correspond to the performance or structure of the system. Additionally, the constituent elements shown in FIG. 2 refer to software and/or hardware constituent elements such as a field programmable gate array (FPGA) and an application specific integrated circuit (ASIC).

As illustrated in FIG. 3, the server 2 may include a second input 210, a second display 220, a second controller 230, a second storage 231, and a second communication device 240. The second input 210 may be configured to receive update information of the application for the vehicle sharing service. The second input 210 may be configured to receive the user information of the user using the vehicle sharing service. The second input 210 may also be configured to receive vehicle assignment information. The second display 220 may be configured to display information corresponding to the vehicle sharing service. In addition, the second display 220 may be configured to display return information of the vehicle for each position, and display the vehicle assignment information.

When the use information of the vehicle sharing service input by the user terminal 3 is received, the second controller 230 may be configured to operate the storage to store the received use information of the vehicle sharing service, assign a vehicle based on the use information of the vehicle sharing service, and operate the second communication device 240 to transmit the identification information of the assigned vehicle to the user terminal 3 requesting the vehicle sharing service. When transmitting the identification information of the assigned vehicle to the user terminal 3, the second controller 230 may be configured to operate the second communication device 240 to transmit information regarding the current position and the return position of the vehicle.

When the schedule information of the user is received by the user terminal 3, the second controller 230 may be configured to obtain the use information of the vehicle sharing service based on the received schedule information, assign a vehicle based on the obtained use information of the vehicle sharing service, and operate the second communication device 240 to transmit the identification information of the assigned vehicle to the user terminal 3 requesting the vehicle sharing service.

The use information of the vehicle sharing service may include at least one of a use of the vehicle, a use start time, a use end time, a riding position and a return position. The second controller 230 may be configured to operate the second communication device 240 to transmit an electronic key for authentication between the assigned vehicle and the user terminal to the user terminal and the vehicle.

Additionally, the second controller 230 may be configured to transmit the control authority information for each of the users to the assigned vehicle 1, and transmit an electronic key including the control authority information of the vehicle to the user terminal 3. For example, when the vehicle use is storing goods or transporting goods, the second controller 230 may be configured to operate the second communication device 240 to transmit an electronic key including the control authority information of a second locking device for locking and unlocking a trunk to the user terminal 3.

For example, when the vehicle use is resting, the second controller 230 may be configured to operate the second communication device 240 to transmit an electronic key including the control authority information of at least one electronic device that controls functions related to the rest of the user to the user terminal 3. When authentication request information of the user terminal is received by the vehicle 1, the second controller 230 may be configured to operate the authentication of the user terminal, and when the authentication request information of the user is received by the vehicle 1, may be configured to operate the authentication of the user based on the user information.

When assigning a vehicle, the second controller 230 may be configured to assign the vehicle based on the use time of the vehicle sharing service and the start position, destination, and the use of the vehicle. The second controller 230 may be configured to calculate the cost of the vehicle sharing service based on the use time of the vehicle sharing service, the traveling distance and the use of the vehicle, and operate the second communication device 240 to transmit the calculated cost to the user terminal 3 or the vehicle 1.

When the use information of the vehicle sharing service input to the vehicle 1 and the identification information of the vehicle is received, the second controller 230 may be configured to operate the second storage to store the received identification information of the vehicle and the use information of the vehicle sharing service. In particular, when the request information of the vehicle sharing service is received by the user terminal without performing vehicle assignment, the second controller 230 may be configured to determine whether the vehicle may be shared with another user based on the stored use information of the vehicle sharing service.

When assigning the vehicle, the second controller 230 may be configured to identify users whose use positions and time zones are identical to each other and whose use of the vehicle is different, and assign the same vehicle to different identified users. The second storage 231 may be configured to store the user information, the terminal information of the user terminal, and the schedule information of the user.

The second storage 231 may also be configured to store assignment information of the user for each vehicle and the use information of the vehicle for each vehicle. The second storage 231 may be configured to store the assignment information and the use information for each time zone. The second communication device 240 may be configured to perform communication with the vehicle 1 and the user terminal 3. The second communication device 240 may be configured to receive the identification information and the location information of the vehicle by the vehicle 1, and receive the use information of the vehicle sharing service input to the vehicle 1.

Further, the second communication device 240 may be configured to receive information regarding the start time and the end time of the vehicle sharing service from the vehicle 1. The second communication device 240 may be configured to receive the user information and the use information of the vehicle sharing service by the user terminal 3, and may transmit the identification information of the assigned vehicle and the cost information of the vehicle sharing service in response to a control command of the second controller 230 to the user terminal 3. The second communication device 240 may then be configured to transmit the assigned user information and the use information of the vehicle in response to the control command of the second controller 230.

FIG. 4 is a block diagram illustrating the terminal communicating with the vehicle according to an exemplary embodiment. As illustrated in FIG. 4, the terminal 3 may include a third input 310, a third display 320, a third controller 330, a third storage 331, and a third communication device 340. The third input 310 may be configured to receive an application download command for the vehicle sharing service, and receive an execution command of the downloaded application.

The third input 310 may be configured to receive a search command of the identification information of the terminal, and when registering the user information in the application, receive the user information and the identification information of the terminal. The third input 310 may be configured to receive an information transmission command of an electronic key of the application. In other words, the third input 310 may be configured to receive a signal of the electronic key button of the application and receive return information of the vehicle through the application.

Additionally, the third input 310 may be configured to receive the schedule information of a user and the user information of the user using the vehicle sharing service. The third input 310 may be configured to receive a communication execution command with the vehicle 1. The third display 320 may be configured to display information corresponding to the vehicle sharing service, display the identification information of a vehicle assigned by a server, and display the use of the vehicle and the control authority information of the vehicle.

The third display 320 may be configured to display a use start time, a use end time, and cost of the vehicle sharing service. In addition, the third display 320 may be configured to display execution information of the vehicle sharing application, display information such as pairing with the vehicle, pairing success and pairing failure with the vehicle, and display information such as authentication success with the vehicle and authentication failure with the vehicle. The third input 310 may be implemented as a touch panel, and the third display 320 may be implemented as a display panel. In other words, the third input and the third display may be implemented as a touch screen in which the touch panel and the display panel are integrated. The third input 310 may further include at least one button.

The third controller 330 may be configured to execute the application when the application execution command is received and operate the display of a member registration window for inputting the user information when a membership registration command is received, and operate the third communication device 340 to transmit the user information to the server 2. When the user information is input to the application, the third controller 330 may be configured to search the identification information of the terminal in response to the reception of a search command of the identification information of the terminal and operate the display to output the searched identification information of the terminal.

The third controller 330 may be configured to operate the third communication device 340 to transmit the use information of the vehicle sharing service inputted through the application to the server 2, and when information of the electronic key is received from the server 2, operate the third storage to store the information of the received electronic key. The third controller 330 may be configured to operate the third communication device 340 to output the information of the electronic key when the electronic key on the application (i.e., the app) is selected. The third controller 330 may also be configured to operate the third communication device 340 to transmit the user information registered in the application to the vehicle when a request signal for providing the user information is received from the vehicle 1.

When the request signal for providing the user information is received from the vehicle 1, the third controller 330 may be configured to operate the third communication device 340 to transmit the terminal information to the vehicle 1. The third controller 330 may be configured to operate the third communication device 340 to transmit information regarding unauthorized use of the vehicle to the server 2 when authentication failure information of the terminal is received by the vehicle. When return information of the vehicle is received via the application, the third controller 330 may be configured to operate the third communication device 340 to transmit the received return information to the server 2 or the vehicle 1.

The third controller 330 may be implemented using a memory (not shown) configured to store data for algorithms to execute operation of elements of the terminal 3 or programs constructed from algorithms, and a processor (not shown) configured to execute the operation using data stored in the memory. In particular, the memory and the processor may be implemented using separate chips or integrated into a single chip.

Further, the third storage 331 may be configured to store the identification information of the terminal and stores the user information. The third storage 331 may be configured to store the application for the vehicle sharing service, store the identification information of the assigned vehicle, and store the information of the electronic key received from the server 2. The electronic key may include information for authentication with the vehicle, and may further include the control authority information for executing at least one function of the functions of the vehicle.

The third storage 331 may be implemented using at least one of a non-volatile memory element, e.g., a cache, Read Only Memory (ROM), Programmable ROM (PROM), Erasable Programmable ROM (EPROM), Electrically Erasable Programmable ROM (EEPROM) and flash memory; a volatile memory element, e.g., Random Access Memory (RAM); or a storage medium, e.g., Hard Disk Drive (HDD) and CD-ROM. The implementation of the memory is not limited thereto.

Each of the memories may be a memory that is implemented as a chip separate from the above mentioned processor related to the third controller 330, or may be implemented on a single chip with a processor. The third communication device 340 may be configured to perform communication with the vehicle 1, and perform communication with the server 2. The third communication device 340 may include wired communication and wireless communication.

The third communication device 340 may be configured to receive a pairing request signal from the vehicle and receive the user information and the request information for providing the identification information of the terminal from the vehicle. The third communication device 340 may be configured to transmit the use information of the vehicle sharing service input to the application to the server 2 in response to a control command of the third controller 330.

The third communication device 340 may be configured to receive the information corresponding to the electronic key from the server 2, transmit the information corresponding to the electronic key to the vehicle 1 in response to a control command of the third controller 330, transmit pairing information and the user information to the vehicle 1, and transmit the identification information of the terminal for authentication of the terminal to the vehicle 1.

Figure 5:
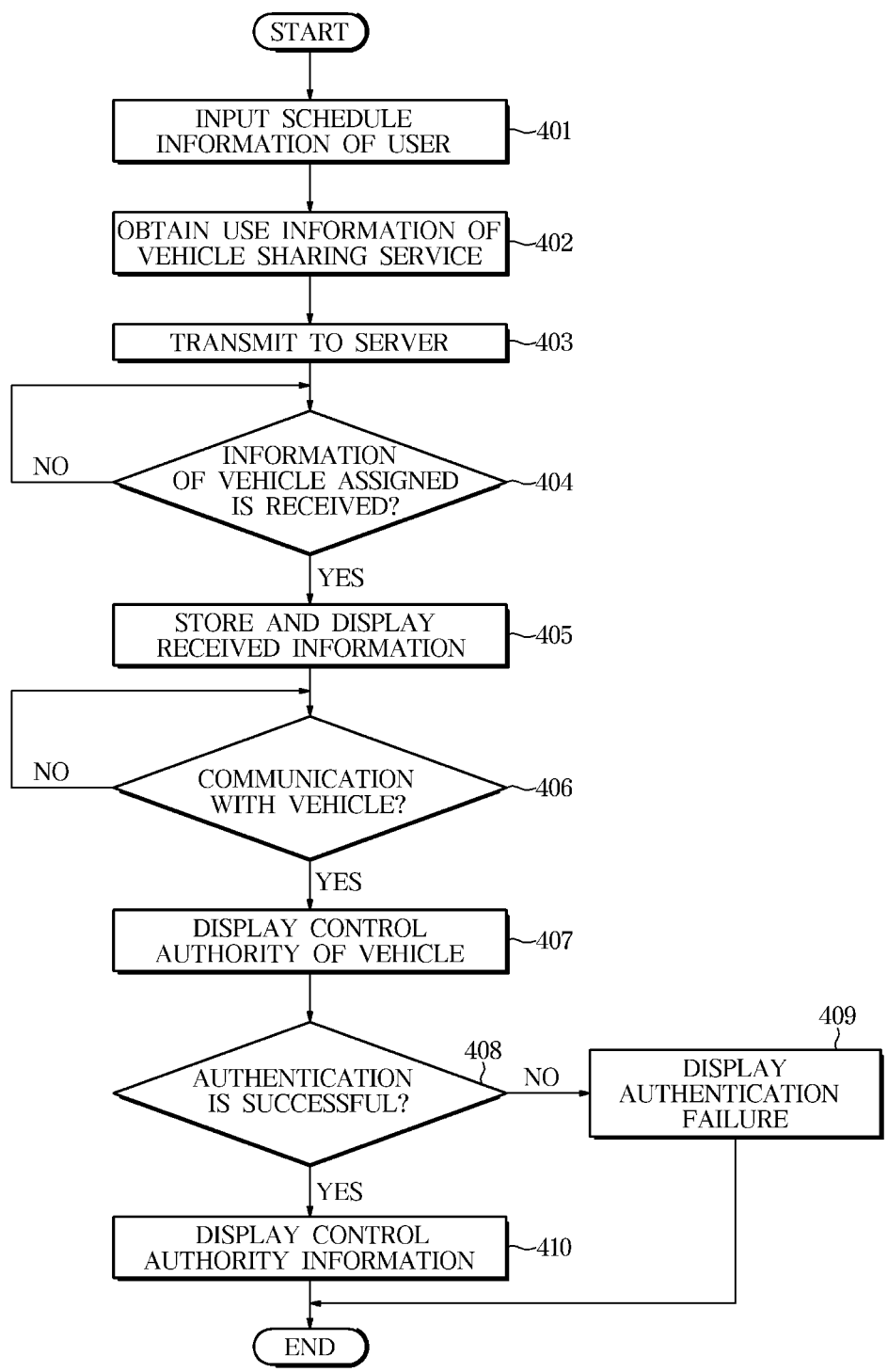
FIG. 5 is a flowchart illustrating an example of a control method of the terminal communicating with the server and the vehicle according to an exemplary embodiment.

The control procedure of the components constituting the vehicle sharing system will be described. FIG. 5 is a flowchart illustrating an example of a control method of the terminal communicating with the server and the vehicle according to an exemplary embodiment. When the application for vehicle sharing is selected by a user, the terminal 3 may be configured to execute the application, and display execution information of the application on the third display.

When the user is not a member of the application, the terminal 3 may request membership registration.

When a membership registration command is received by the third input, the terminal 3 may be configured to display a membership registration window on the third display, and when the user information and the identification information of the terminal 3 corresponding to the display information of the third display and are input by the third input, transmit the input user information and the identification information of the terminal to the server 2. As a result, user registration may be performed as a member for the vehicle sharing service.

The terminal 3 may be configured to execute the application, receive the use information of the vehicle sharing service through the application, and when the input of the use information of the vehicle sharing service is completed, transmit the use information of the vehicle sharing service to the server 2. When the schedule information of the user is input (401), the terminal 3 may be configured to obtain the use information of the vehicle sharing service based on the inputted schedule information of the user (402), and transmit the use information and the user information of the vehicle sharing service to the server (403).

The use information of the vehicle sharing service may include at least one of a use start time, a use end time, a use of a vehicle, a riding position of a vehicle, and a returning position. The terminal 3 may be configured to transmit the schedule information of the user input by the third input to the server 2. At this time, the server may be configured to obtain the use information of the vehicle sharing service based on the received schedule information of the user. Particularly, the terminal 3 may be configured to transmit the schedule information of the user to the server 2 by linking a user's schedule management application and the application of the vehicle sharing service.

The terminal 3 may be configured to receive the schedule information of the user through the application of the vehicle sharing service. When the information of the vehicle assigned from the server 2 is received (404), the terminal 3 may be configured to store and display the received information of the vehicle (405). The information of the assigned vehicle may include the identification information of the vehicle, the authentication information for performing authentication with the vehicle, and the control authority information for executing at least one function or all functions of the vehicle. The terminal may be configured to receive information for the user authentication and the control authority of the vehicle as an electronic key.

When the application is executed by the user and the electronic key of the application is selected, the terminal 3 may be configured to perform communication with the vehicle by transmitting information of the electronic key to the vehicle. When communicating with the vehicle (406), the terminal 3 may be configured to perform authentication during communication with the vehicle (407), determine whether the authentication is successful (408), when the authentication fails, display the authentication failure information (409), when the authentication is successful, receive the control authority for executing at least one function or all functions of the vehicle, and display the received control authority information (410).

The received control authority information may be information corresponding to the use of the vehicle requested by the user when requesting the vehicle sharing service. At this time, the user has only the control authority for at least one function corresponding to the use of the vehicle. In other words, the user may use only the electronic device for performing the function of at least one of a plurality of electronic devices provided in the vehicle. At this time, in the vehicle, only the electronic device for performing at least one function may be operated.

The terminal 3 may be configured to transmit to the vehicle a control signal of an electronic device which is authorized to be operated among the plurality of electronic devices provided within the vehicle. For example, when operation for trunk lock and unlock is authorized and the electronic key is selected by the user, the terminal 3 may be configured to transmit a control signal of the second lock device for the trunk lock and unlock to the vehicle. When operation for rest is authorized and the electronic key is selected by the user, the terminal 3 may be configured to transmit to the vehicle a control signal for activating at least one electronic device related to the rest.

The terminal 3 may be configured to determine whether return is selected through the application, and when the return is selected through the application, transmit the end information of the vehicle sharing service to the vehicle or the server. The return selection may include selecting a return button in the application. When a current time is determined to be a use end time of the vehicle sharing service, the terminal 3 may be configured to display end guidance information of the vehicle sharing service, and display information regarding the restriction of the control authority. The control authority of the vehicle stored in the terminal may be deleted. In other words, the function of the electronic key stored in the terminal may be lost.

Figure 6:
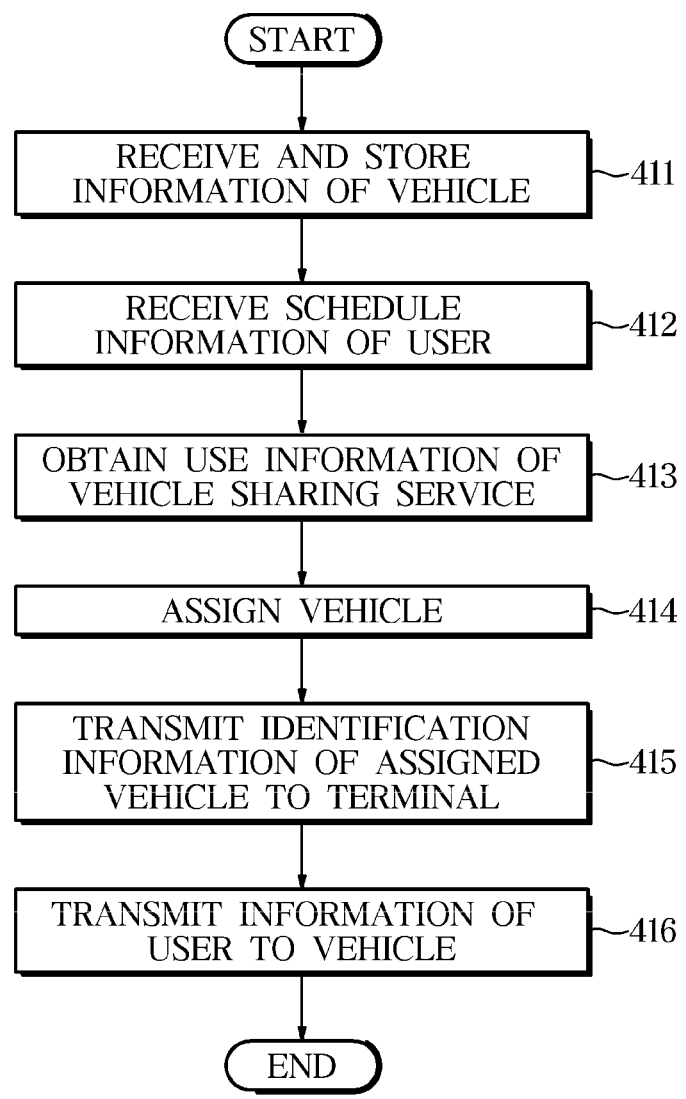
FIG. 6 is a flowchart illustrating an example of a control method of the server communicating with the vehicle according to an exemplary embodiment.

FIG. 6 is a flowchart illustrating an example of a control method of the server communicating with the vehicle according to an exemplary embodiment. When the use information of the vehicle sharing service is received from the vehicle 1, the server 2 may be configured to store the received use information of vehicle sharing service together with the information of the vehicle. The information of the vehicle may include the current position information of the vehicle and the identification information of the vehicle.

When storing the usage information of the vehicle sharing service, the server 2 may be configured to store the user information inputting the use information of the vehicle sharing service, obtain the use information of the vehicle of each time zone based on the use information of the vehicle sharing service, and store the use information of the vehicle of each time zone together with the user information. The server 2 may be configured to store the terminal information of the user terminal held by the user when storing the user information.

When the use information of the vehicle sharing service is received from the vehicle 1, the server 2 may be configured to store the vehicle that transmitted the use information of the vehicle sharing service as the vehicle directly assigned by the user. When the end information of the vehicle sharing service is received from the vehicle 1, the server 2 may be configured to store the identification information of the vehicle that transmitted the end information of the vehicle sharing service. At this time, the server 2 may be configured to store the current position information of the vehicle, which is a position where the vehicle is returned, and store the vehicle as the vehicle assignable for the vehicle sharing service.

Accordingly, the server 2 may be configured to receive and store various information transmitted from the vehicle (411). When the schedule information of the user is received (412) from the user terminal 3, the server 2 may be configured to obtain the use information of the vehicle sharing service based on the received schedule information (413), assign a vehicle based on the obtained use information (414), and transmit the identification information of the assigned vehicle to the user terminal 3 requesting the vehicle sharing service (415). In particular, the use information of the vehicle sharing service includes at least one of a use start time, a use end time, a use of a vehicle, a riding position of the vehicle, and a return position.

The server 2 may be configured to transmit the control authority information that corresponds to the use of the vehicle to the user terminal 3. The server 2 may be configured to transmit the user's information to the assigned vehicle (416). The server 2 may be configured to transmit the control authority information of each of the users to the vehicle and transmit the authentication information for authentication between the vehicle and the user to the vehicle and the user terminal. The authentication information for authentication between the vehicle and the user may be an electronic key.

When the use information of the vehicle sharing service input to the user terminal 3 is received, the server 2 may be configured to store the received use information, assign a vehicle based on the use information of the vehicle sharing service, and transmit the identification information of the assigned vehicle to the user terminal 3 requesting the vehicle sharing service. When the identification information is transmitted to the user terminal 3, the server 2 may be configured to transmit information regarding the current position and the return position of the vehicle When the authentication request information of the user terminal 3 is received by the vehicle 1, the server 2 may be configured to execute the authentication of the user terminal, and when the authentication request information of the user is received by the vehicle 1, execute the authentication of the user based on the user information.

FIGS. 7, 8, 9, 10, and 11 are exemplary views illustrating a vehicle assignment in the server communicating with the vehicle according to an exemplary embodiment. The server provides the vehicle sharing service to various users at the same time. The server may be configured to identify the use information of the vehicle sharing service of a plurality of users, and generate the use information of the vehicle for each of the users based on the identified use information. In other words, the server may be configured to generate a schedule for use of the vehicle corresponding to the time zone with each of the users.

More specifically, the server 2 may be configured to detect a riding position, a use start time, a use end time, a return position (i.e., destination) of a first user among the use information of the vehicle sharing service, identify a vehicle that may be used at the start time of use at the identified riding position among the plurality of vehicles, and assign the identified vehicle to a vehicle for providing the vehicle sharing service to the first user. The server may be configured to detect a riding position, a start time of use, a end time of use, and return position (i.e., the destination) of a second user among the use information of the vehicle sharing service and, identify a vehicle that may be used at the start time of use at the identified riding position among the plurality of vehicles, and assign the identified vehicle to a vehicle for providing the vehicle sharing service to the second user.

The server may be configured to detect a riding position, a start time of use, a end time of use, and return position (i.e., the destination) of a third user among the use information of the vehicle sharing service and, identify a vehicle that may be used at the start time of use at the identified riding position among the plurality of vehicles, and assign the identified vehicle to a vehicle for providing the vehicle sharing service to the third user. When assigning the plurality of users' vehicles, the server may be configured to assign the vehicles to share one vehicle at the same time zone based on the use location of the vehicle, the use of the vehicle, and the use time of the vehicle.

As illustrated in FIG. 7, when the vehicle sharing service for travelling and storing goods at a first time zone (7:00-10:00), storing only the goods at a second time zone (10:01-12:00) and travelling and storing goods at a third time zone (12:01-16:00) is requested by the first user (user A), the server 2 may be configured to assign a vehicle for providing the vehicle sharing service to the first user (user A) based on the location information of the plurality of vehicles.

When the vehicle sharing service for resting at the second time zone (10:01-12:00) is requested by the second user (user B), the server may be configured to assign a vehicle that provides the vehicle sharing service to the second user (user B). When assigning the vehicle to be served to the second user, the server may be configured to search for a vehicle that may be shared with other users, and may be configured to assign the searched vehicle to a vehicle that provides the vehicle sharing service to the second user (user B).

When the use of the vehicle is resting, the server may be configured to assign a vehicle that is maintained in a parked state among the plurality of vehicles to a vehicle that provides the vehicle sharing service to the second user (user B). In this way, when providing the vehicle sharing service in which one vehicle is shared by different users, the server 2 may be configured to charge the vehicle sharing service at a discount.

When the vehicle sharing service for traveling at a fourth time zone (16:01-22:00) is requested by the third user (user C), the server may be configured to assign a vehicle that provides the vehicle sharing service to the third user (user C) among the plurality of vehicles based on the location information of the plurality of vehicles, the use position and the use time of the third user (user C) among the plurality of vehicles. In other words, when the vehicle sharing service ending at 16:00 at the first return position is requested by the first user and the vehicle sharing service for traveling at the fourth time zone (16:01-22:00) from the first return position is requested by the third user, the server may be configured to assign the vehicle used by the first user to the third user.

As illustrated in FIG. 8, when the vehicle sharing service for traveling at the first time zone (7:00-10:00), resting at the second time zone (10:01-12:00), traveling at the third time zone (12:01-16:00) is requested by the first user, the server 2 may be configured to assign a vehicle to provide the vehicle sharing service to the first user (user A) based on the location information of the plurality of vehicles. When the vehicle sharing service for transporting goods is requested by the second user (user B), the server may be configured to search for a vehicle to provide the vehicle sharing service to the second user (user B) based on the originating position of the goods, the receiving position (ex: destination) of the goods, and traveling information of the vehicles already assigned to other users.

When the originating position and the receiving position of the transported goods of the second user are the same as a start position and a destination position of traveling of the first user, the server may be configured to assign the vehicle assigned to the first user to the second user. At this time, the server may be configured to transmit a use start time of the vehicle and the identification information of the vehicle assigned to the user terminal of the second user. In addition, the server may be configured to assign the vehicle based on a use time for the second user to transfer the goods. The server may be configured to assign a vehicle that is maintained in a parked state or a stopped state among the plurality of vehicles to a vehicle that provides the vehicle sharing service when the use of the vehicle is the storing goods.

The vehicle maintained in the parked or stopped state may be a vehicle that is not assigned to another user, or a vehicle that provides rest to other users. In other words, the server may be configured to assign one of the parked or stopped vehicles to a vehicle of the vehicle sharing service when not performing the traveling, such as the resting and the storing goods. Thus, by providing a non-travelling vehicle as a keeping space, it may be possible to provide convenience to a user who travels to a tourist spot.

As illustrated in FIG. 9, the server provides the vehicle sharing service where one vehicle is used by multiple users. The server allows other users to use the vehicle for storing goods (S) or resting (F) when one vehicle is not used for travelling (D).

As illustrated in FIG. 10, when the vehicle sharing service for the purpose of traveling from 7:00 to 12:00 and 17:00 to 19:00 is requested by the first user and the vehicle sharing service for the purpose of traveling between 12:00 and 17:00 is requested by the second user, the server may be configured to assign a vehicle V1 assigned to the first user to the second user based on the start position, the destination position, the use start time and the use end time of the first and second users, and may be configured to assign another vehicle (V1->V2) to the first user.

As illustrated in FIG. 11, when the vehicle sharing service for traveling from 7:00 to 12:00 and from 17:00 to 19:00 is requested by the first user and the vehicle sharing service for storing goods between 12:00 and 17:00 is requested by the second user, the server may be configured to assign the first vehicle V1 to the first user based on a start position, a destination position, a use start time, and a use end time of the traveling of the first and second users, and assign the first vehicle to the second user at a time when the first vehicle is not being used by the first user.

When the goods of the second user is maintained in the time zone when the first vehicle is used again by the first user (i.e., from 17:00 to 19:00), the server may be configured to transmit information requesting the user terminal of the second user to drop off the goods, and assigns another vehicle V2 to the first user. When the storage time of the second user has elapsed, the server may be configured to transmit information requesting the user terminal of the second user to drop off the goods. At this time, the server may be configured to charge an additional fee to the second user. In other words, the server may be configured to transmit information regarding the additional cost to the user terminal of the second user.

Figure 12:
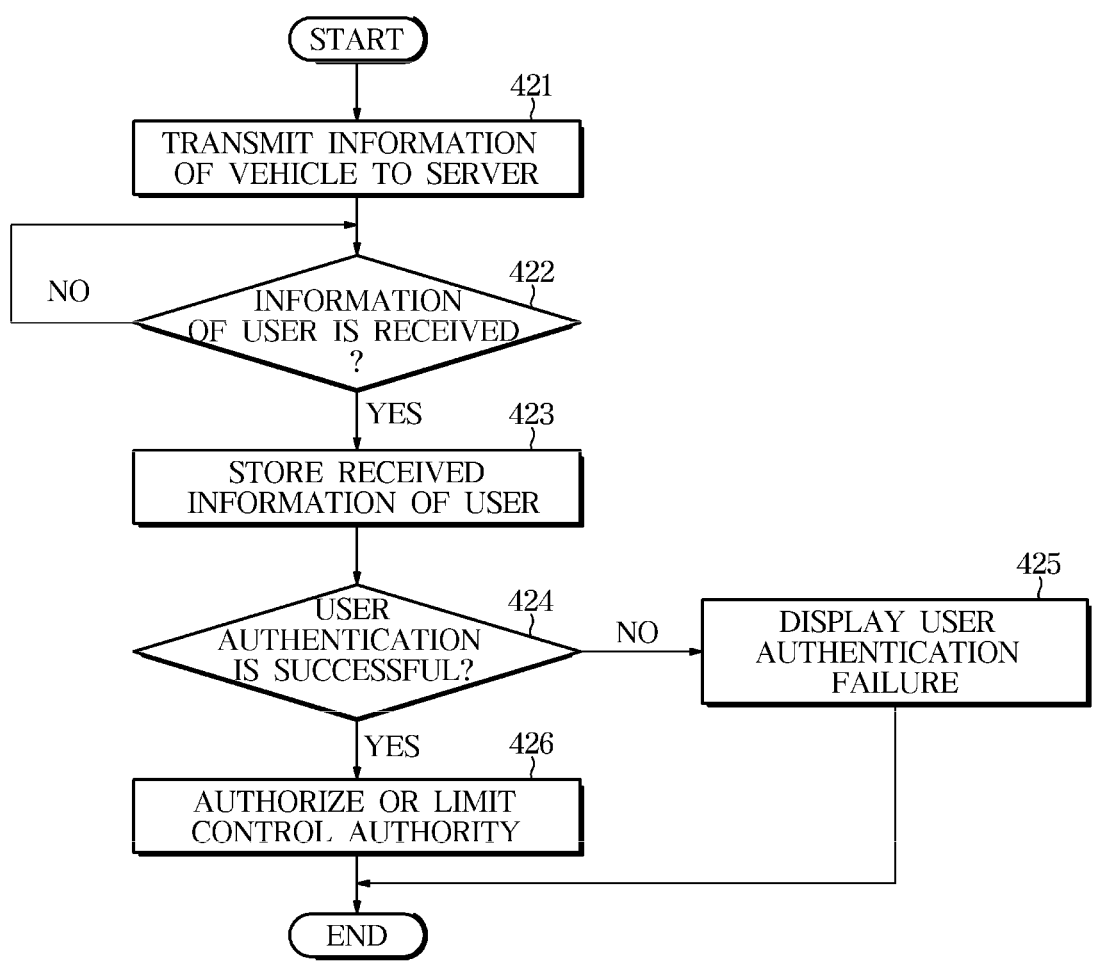
FIG. 12 is a flowchart illustrating an example of a control method of the vehicle according to an exemplary embodiment.

FIG. 12 is a flowchart illustrating an example of a control method of the vehicle according to an exemplary embodiment. The vehicle may be configured to transmit the current position information and the identification information to the server (421). When the use information of the vehicle sharing service is input through the first input of a vehicle terminal, the vehicle may be configured to transmit the use information of the vehicle sharing service to the server.

When the user information is received, the vehicle stores the use information of the vehicle sharing service transmitted from the server and the use information and the user information of the received vehicle sharing service (423). When the user information is received through the first input of the vehicle terminal or the user terminal (422), the vehicle compares the received user information with the stored user information to perform user authentication, and determines whether the user authentication is successful (424).

When the user authentication fails, the vehicle may be configured to output the user authentication failure information (425). When the user authentication is successful, the vehicle may be configured to authorize the control authority of at least one function provided in the vehicle, or limit the control authority of at least one function provided in the vehicle (426). The vehicle may be configured to authorize the user to execute the at least one function provided in the vehicle based on a current time and the use information of the vehicle sharing service, or limit the control authority of at least one function provided in the vehicle.

For example, when the vehicle use is storing goods or transporting goods, the vehicle may be configured to authorize operation of a second locking device for locking and unlocking a trunk. In other words, the vehicle may be configured to authorize only the control authority to the user for the second locking device. The vehicle may be configured to operate the second locking member in response to a signal reception of an electronic key stored in the user terminal.

The vehicle may be configured to activate opening and closing buttons of a door and the trunk, and operate a first locking member and the second locking member to open and close the door and the trunk corresponding to the user's operation. When the vehicle use is resting, the vehicle may be configured to authorize the control authority to at least one electronic device that executes the function associated with the rest of the user. The at least one electronic device for executing the function related to the rest may include a vehicle terminal, a seat adjusting member, an air conditioner, a window glass opening/closing device, a heating wire of a seat, and a ventilation device.

In other words, the vehicle may be configured to activate the operation of the opening/closing button of the door, activate the operation of the at least one electronic device for performing the function related to the rest of the user. The vehicle may be configured operate the door and the at least one electronic device in response to user manipulation by authorizing the control authority of the door and the at least one electronic device to the user. At this time, the vehicle may be configured to periodically communicate with the user terminal, perform authentication with the user terminal, and authorize the control authority to the user when authentication with the user terminal is successful.

The vehicle may be configured to operate a radio and a sound output unit when the radio function is selected by the user, and causes the radio to be output with a broadcast and a volume selected by the user. The vehicle may be configured to adjust a position and height of the seat and an inclination of the backrest based on information operated by the user when the seat adjusting member is operated by the user. The vehicle may be configured to operate the air conditioner based on an indoor target temperature and air volume information input by the user. When the vehicle use is traveling, the vehicle may be configured to authorize the control authority to all the electronic devices provided to the vehicle.

In addition, when the use of the vehicle by another user is used for transporting goods, the vehicle may be configured to limit the control authority for locking and unlocking the trunk. The vehicle may be configured to perform user authentication, identify the use of the vehicle corresponding to the authenticated user, and output a warning message when a control command for a function other than at least one function corresponding to the identified use is received. At this time, a warning message may be displayed through the vehicle terminal, and the warning message may be transmitted to the user terminal to display the warning message through the user terminal.

As is apparent from the above description, a vehicle, a server, and a method of controlling the vehicle in accordance with one exemplary embodiment of the present disclosure may allow a plurality of users to use one vehicle at the same time by dividing and authorizing the control authority allowed to the one vehicle. In other words, the present disclosure may allow the plurality of users to rent and use one vehicle on the vehicle sharing system. Further, the present disclosure may assign a vehicle according to the use of the vehicle corresponding purpose of the user by using the schedule information of the user input to the terminal for the user.

As described above, according to the present disclosure a user may rent the vehicle according to purpose of the user. This allows the vehicle sharing service to be managed more efficiently. Further, the present disclosure may transfer goods of other users by utilizing traveling information of the user. As described above, according to the present disclosure, by restricting the control authority of the vehicle, safety of vehicle sharing may be improved, use of vehicle sharing may be improved, and users' satisfaction with vehicle sharing may be improved.

Meanwhile, the disclosed exemplary embodiments may be embodied in the form of a recording medium storing instructions executable by a computer. The instructions may be stored in the form of a program code and, when executed by a processor, may generate a program module to perform the operations of the disclosed embodiments. The recording medium may be embodied as a non-transitory computer-readable recording medium. The non-transitory computer-readable recording medium includes all kinds of recording media in which instructions which can be decoded by a computer are stored. For example, there may be Read Only Memory (ROM), Random Access Memory (RAM), a magnetic tape, a magnetic disk, a flash memory, and an optical data storage device.

Although a few exemplary embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle, comprising:
a storage configured to store information regarding a plurality of uses and at least one function corresponding to each of the uses;
a communication device configured to communicate with at least one of a server and a terminal for a user; and
a controller configured to, when use information of a vehicle sharing service is received by the communication device,
identify the use corresponding to the use information of the received vehicle sharing service,
identify at least one function corresponding to the identified use based on the information stored in the storage, and
authorize control corresponding to the identified at least one function,
wherein the use of the vehicle includes travelling, storing goods, transporting goods, and resting,
wherein, when the identified use of the vehicle is the travelling, the controller is configured to authorize operation of a plurality of electronic devices including a power system, a braking device, a steering device, a suspension device, and a transmission, and
when the identified use of the vehicle is the resting, the controller is configured to authorize operation of a door and electronic devices for rest of the user, and limit operation of the power system, the braking device, the steering device, the suspension device, and the transmission,
wherein the electronic devices for rest of the user include a seat adjustment, a heating wire of a seat, an air conditioner, a radio, a window glass, the communication device and a terminal for the vehicle.

2. The vehicle of claim 1, further comprising:
an input configured to receive user input,
wherein the controller is configured to execute the at least one function based on the user input corresponding to the at least one function among the user inputs received by the input.

3. The vehicle of claim 1, wherein, when a signal corresponding to control authority information stored in the terminal for the user is received by the communication device, the controller is configured to execute the at least one function based on the received signal.

4. The vehicle of claim 1, wherein the storage is configured to store control authority information transmitted by the server and terminal information of the terminal for the user, and when communication with the terminal for the user is performed, the controller is configured to activate the operation of at least one electronic device for executing the at least one function based on the stored control authority information.

5. The vehicle of claim 1, wherein the use information of the vehicle sharing service includes user information of each time zone and the use of the vehicle for each of the users and the user information includes at least one of identification information of the user and terminal information of the terminal for the user.

6. The vehicle of claim 5, wherein, in response to determining that a plurality of the users are assigned at the same time, the controller is configured to identify each of the uses of the vehicle for the plurality of users and authorize control of different functions for each of the users based on the use of the vehicle for each of the users.

7. The vehicle of claim 6, wherein the controller is configured to perform user authentication for each of the users, and when the user authentication is completed, authorize the control of different functions for each of the users.

8. The vehicle of claim 1, wherein, when the identified use of the vehicle is storing goods, the controller is configured to authorize operation of a locking member for locking and unlocking a trunk.

9. The vehicle of claim 1, wherein the controller is configured to perform authentication of a first user, and when the use of the vehicle by the first user is travelling, detect whether the use of the vehicle is being used by a second user for the transporting goods, and when the use of the vehicle is being used by the second user for transporting goods, and limit operation of a locking member for locking and unlocking a trunk to the first user.

10. The vehicle of claim 1, wherein the controller is configured to perform authentication of a first user, and when the use of the vehicle by the first user is resting, detect whether the use of the vehicle is being used by a second user for transporting goods, and when the use of the vehicle is being used by the second user for transporting goods, and limit operation of a locking member for locking and unlocking a trunk and a driving device for traveling to the first user.

11. A server, comprising:
a communication device configured to communicate with a vehicle and a terminal for a user; and
a controller, configured to, when at least one of schedule information of the user and use information of a vehicle sharing service is received by the terminal for the user,
assign the vehicle to be provided with the vehicle sharing service to the user based on the received at least one piece of schedule information and position information of a plurality of the vehicles,
operate the communication device to transmit identification information of the assigned vehicle to the terminal for the user, and
operate the communication device to transmit user information, use information of the vehicle, and control authority information to the assigned vehicle,
wherein the use information of the vehicle sharing service includes user information of each time zone, and a use of the vehicle, a use start time, a use end time, a riding position and a return position for each of the users, and,
wherein the use of the vehicle includes travelling, storing goods, transporting goods, and resting,
wherein, when the use of the vehicle is travelling, the controller is configured to authorize operation of a plurality of electronic devices including a power system, a braking device, a steering device, a suspension device, and a transmission, and
when the use of the vehicle is the resting, the controller is configured to authorize operation of a door and electronic devices for rest of the user, and limit operation of the power system, the braking device, the steering device, the suspension device, and the transmission,
wherein the electronic devices for rest of the user include a seat adjustment member, a heating wire of a seat, an air conditioner, a radio, a window glass, a communication device and a terminal for the vehicle.

12. The server of claim 11, wherein, when assigning the vehicle, the controller, is configured to identify the users with the same time zone using the vehicle sharing service, identify at least two of the users whose use of the vehicle are different among the identified users, and assign the same vehicle to the identified at least two users.

13. The server of claim 12, wherein the controller is configured to operate the communication device to transmit the authentication information for authentication between the assigned vehicle and the terminal for the user, and the control authority information corresponding to the use of the vehicle to the terminal for the user.

14. The server of claim 11, wherein, when location information and the identification information of at least one of the vehicles is received by the at least one vehicle, the controller is configured to operate a storage to store the received location information and the identification information of the at least one vehicle.

15. A method for controlling a vehicle, comprising:
identifying, by a controller, a use corresponding to use information of a vehicle sharing service, when the use information of the vehicle sharing service is received by a communication device;
identifying, by the controller, at least one function corresponding to the identified use based on information stored in a storage;
authorizing, by the controller, operation corresponding to the identified at least one function; and
limiting, by the controller, operation of remaining functions,
wherein the use of the vehicle includes travelling, storing goods, transporting goods, and resting,
wherein, the authorizing, by the controller, operation corresponding to the identified at least one function includes:
authorizing, by the controller, operation of a plurality of electronic devices including a power system, a braking device, a steering device, a suspension device, and a transmission, when the identified use of the vehicle is the travelling, and
authorizing, by the controller, operation of a door and electronic devices for rest of the user, when the identified use of the vehicle is the resting,
wherein, the limiting, by the controller, operation of remaining functions includes: limiting, by the controller, operation of the power system, the braking device, the steering device, the suspension device, and the transmission, when the identified use of the vehicle is the resting, and
wherein the electronic devices for rest of the user include a seat adjustment member, a heating wire of a seat, an air conditioner, a radio, a window glass, the communication device and a terminal for the vehicle.

16. The method of claim 15, wherein the authorizing operation corresponding to the identified at least one function includes:
performing, by the controller, user authentication;
executing, by the controller, the at least one function based on a user input corresponding to the at least one function among user inputs received by an input, when the user authentication is successful; and
executing, by the controller, when a signal corresponding to control authority information stored in the terminal of the user is received, the at least one function based on the received signal.

17. The method of claim 15, further comprising:
in response to determining that a plurality of users are assigned at the same time, detecting, by the controller, the use of the vehicle for the plurality of users; and
authorizing, by the controller, execution of different functions for each of the users based on the use of the vehicle for each of the users.

18. The method of claim 15, further comprising:
performing, by the controller, user authentication;
identifying, by the controller, the use of the vehicle corresponding to the authenticated user; and
outputting, by the controller, a warning message, when a control command for the function other than the at least one function corresponding to the identified use is received.

* * * * *